INVENTORS
ALFRED L.W. WILLIAMS
CHARLES K. GRAVLEY

ATTORNEY

Sept. 11, 1962 A. L. W. WILLIAMS ET AL 3,052,949
METHOD OF PRODUCING CELLULAR CERAMIC ELECTROMECHANICAL
TRANSDUCERS, TRANSDUCER MATERIALS AND ELEMENTS
Original Filed Dec. 21, 1953 2 Sheets-Sheet 2

INVENTORS
ALFRED L.W. WILLIAMS
CHARLES K. GRAVLEY

BY

ATTORNEY

3,052,949
METHOD OF PRODUCING CELLULAR CERAMIC ELECTROMECHANICAL TRANSDUCERS, TRANSDUCER MATERIALS AND ELEMENTS
Alfred L. W. Williams, Cleveland, and Charles K. Gravley, Willoughby, Ohio, assignors to Clevite Corporation, Cleveland, Ohio, a corporation of Ohio
Application July 25, 1957, Ser. No. 674,205, now Patent No. 2,892,107, dated June 23, 1959, which is a continuation of application Ser. No. 399,282, Dec. 21, 1953. Divided and this application Sept. 22, 1958, Ser. No. 762,450
8 Claims. (Cl. 29—25.35)

This invention relates to methods of producing electromechanical transducer elements.

The term "piezoelectric" is used herein as meaning and synonymous to, "electromechanically responsive," i.e., capable of converting applied electrical energy to mechanical energy or applied mechanical energy to electrical energy. In other words, these terms are employed herein without distinction as to whether the conversion (or response) is linear or non-linear, electrostrictive or magnetostrictive.

The present invention is concerned primarily with the improvement of piezoelectric elements, e.g., electromechanical transducers, composed of electromechanically responsive polycrystalline ceramic materials (particularly ferroelectric ceramic materials), which are capable of accepting and retaining electrostatic polarization. Examples of such transducers are disclosed in United States Letters Patent No. 2,486,560 to R. B. Gray and No. 2,708,244 to B. Jaffe.

The aforementioned patent to Gray discloses transducer elements formed of barium titanate ceramics while the Jaffe patent relates to transducers composed of ceramic solid solutions of lead zirconate and lead titanate. These two are, most likely, the best and most widely used ferroelectric, polycrystalline ceramic transducer materials known at the present time and will be used as illustrative examples in describing the present invention; however, it will be appreciated as this description proceeds that the basic inventive principles disclosed can be applied to any of the presently known or henceforth discovered electromechanically responsive materials which lend themselves to the performance of the method steps of the invention. Insofar as is known, only monocrystalline piezoelectric materials such as quartz, Rochelle salt, ammonium dihydrogen phosphate, tourmaline and the like would not be satisfactory.

A particularly important aspect of the present invention is in connection with underwater electroacoustic transducers, in which electrical energy applied to the transducer causes it to radiate acoustic energy into the water or an acoustic signal transmitted through the water actuates the transducer to produce an electrical response.

It is well known that a prime requisite of underwater electroacoustic transducers for efficient operation is a good impedance match of the transducer with water. This applies also to ultrasonic transducers, such as are used for cleaning, sonic irradiation, etc., which may operate in fluid transmission mediums other than water.

The impedance matching of transducers to transmission mediums has long been a serious problem in the art. Many of the piezoelectric transducing materials and elements heretofore available have a characteristic density and mechanical compliance and, therefore, a fixed acoustic impedance. This acoustic impedance usually is much higher than that of water or the other transmission fluid involved. This is particularly true of the polycrystalline ferroelectric ceramics. For example, the normal specific acoustic impedances of lead zirconate titanate and barium titanate ceramics are in the range from about 20 to $30 \times 10^6$ (kg./m.$^3$) (m./sec.) as compared to $1.5 \times 10^6$ for water. Some monocrystalline transducer materials, e.g., ammonium dihydrogen phosphate ($NH_4H_2PO_4$) have relatively low acoustic impedance which are a comparatively good match to water but these materials suffer from other disadvantages: they are limited in size and, therefore, are not suitable for low frequency resonant operation unless mass-loading is resorted to; they are relatively more expensive to produce than polycrystalline materials and are not susceptible of being formed and shaped by ceramic techniques; and, for generating highly directional signals, large heavy arrays of monocrystalline elements must be used because of their individual size limitations.

Due to the inherent shortcomings of monocrystalline transducer materials and elements, the trend in recent years has been toward polycrystalline materials such as the ferroelectric ceramics mentioned hereinabove. Heretofore, the problem of impedance matching thus encountered has been attacked by resort to various impedance transformation means. Such impedance matching expedients, however, obviously are undesirable in that they add weight, bulk, complexity and cost to the transducer.

These difficulties and problems are overcome by the present invention which contemplates an electromechanical transducer comprising a cellulated, i.e., macroscopically porous or spongoid body of electromechanically responsive ceramic material. Due to the fact that the ceramic material is cellular, its density is less and its compliance greater than conventional material; thus it has a lower characteristic impedance which is a much better match to water and most other common transmission mediums.

The present invention encompasses a method of fabricating cellular transducer elements of electromechanically responsive ceramic material which comprises the step of aerating the material to reduce its density.

It is a general object of the invention to provide a novel method of producing electromechanical transducer elements which overcome at least one of the problems of the prior art.

It is another general object of the invention to provide a novel method of producing ceramic transducer elements of low density which are capable of a substantial electromechanical response.

Still another object of the invention is the provision of a novel method of producing transducer elements capable of satisfying the practical requirements for underwater transducer operation.

A further object of the invention is the provision of a novel method of producing electromechanical transducer elements of cellulated ceramic material which, because of their porous structure, have a reduced mechanical characteristic impedance, which have a reduced elastic coupling between their parallel and lateral modes, and which are capable of an effective electromechanical response over a wider frequency bandwidth.

A further object of the present invention is to provide a method of producing more readily machinable ceramic electromechanical transducer elements.

A still further object of the present invention is to provide a method of producing novel transducer elements of ceramic material which have improved piezoelectric activity in its parallel mode, as compared with prior art elements of this general type.

Further objects and advantages of the invention as well as the specific details of construction and mode of operation of the transducer element and the preferred manner of making it will be apparent from the following description taken in conjunction with the subjoined claims and annexed drawings, in which, FIGURE 1(a) is a flow diagram of the preferred process of making cellular ceramic transducer elements in accordance with the present invention;

The method contemplated by the present invention comprises two phases: (1) the fabrication of the ceramic body or material and (2) the completion of the transducer element.

Figure 1A:
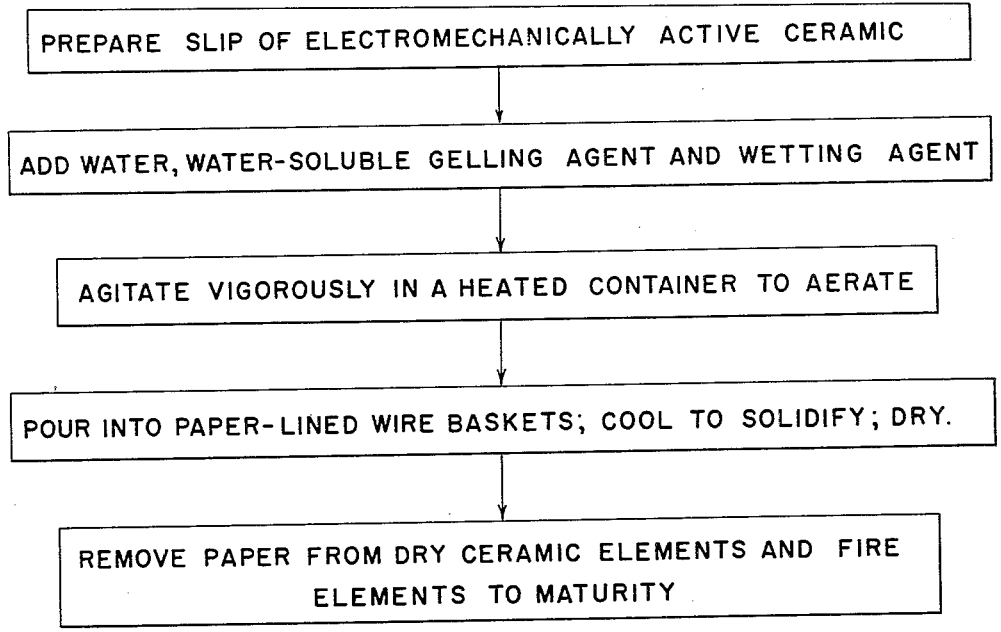
FIGURE 1(b) is a flow diagram of further process steps for completing the fabrication of transducers according to one embodiment of the invention.

The flow diagram in FIGURE 1(a) illustrates broadly the steps involved in the first phase of the method. Thus, in accordance with the invention a slip is prepared of the raw ingredients or precursors of an electromechanically active ceramic. To this slip is added water, a gelling agent and a wetting agent. The slip is beaten with a food mixer in a heated container to aerate it and then poured into paper-lined molds to cool, solidify and dry. The dried elements are removed from the molds and fired to ceramic maturity.

Before proceeding with detailed examples of this phase of the method, it is pointed out that the first phase of the method may be applied to any electromechanically responsive material which can be prepared in ceramic form or by ceramic techniques. The following examples illustrate the application of the invention to ferroelectric ceramics, specifically, to barium titanate and lead zirconate titanate. Ferromagnetic transducer materials and elements which may be fabricated according to this phase of the invention are described and claimed in application Serial No. 674,204 of Harry B. Miller entitled "Ferrite Transducers," filed July 25, 1957 and assigned to the same assignee as the present invention.

EXAMPLE I

In practicing the method outlined in FIGURE 1(a) with barium titanate, the first step is to prepare a slip containing, on a weight basis, barium titanate powder, about 20% or more water, 1½% P.V.A. 70–05 (polyvinyl alcohol) (another water-soluble binder such as gelatin could also be used), and 1% Marasperse C.B. (a dispersing agent which is a sodium salt of ligno-sulfonic acid). To this standard BaTiO₃ slip is added water, Igapal (a wetting agent), 2% triethanolamine (added primarily for the purposes of promoting dispersion and plasticizing the binder so that the resultant elements dry without cracking), and enough of the water-soluble gelling agents ammonium pentaborate and Congo red that the resultant elements are stiff at room temperature.

This mixture is a relatively thick gel at this point and is put into a container and heated to a temperature of about 55° C. After heating it converts to a somewhat viscous liquid. The heated liquid mixture then is vigorously agitated to entrain bubbles of air or other ambient gaseous medium. The aeration may be accomplished conveniently by whipping the mixture with a conventional motor-driven food mixer, such as a "Sunbeam Mixmaster." Sufficient aeration usually requires whipping for eight minutes or more. Use of this method of agitation gives satisfactory results with the entrained gas bubbles dispersed more or less uniformly throughout the mixture. It is pointed out that, in most cases, the whipping would be carried out in an ordinary atmosphere; however, this could be done in an enclosure filled with some other gas and it is to be understood that the terms "aerated," "air bubbles," and the like are used loosely throughout this description and the appended claims and are intended to encompass gases other than air.

The density of the finished BaTiO₃ elements produced by the process is determined by the amount of water in the BaTiO₃ mixture, the amount of wetting agent therein, and its temperature during the beating operation.

After being aerated in the manner just described, the foamed BaTiO₃ dispersion is poured into paper-lined, open mesh wire baskets, where the BaTiO₃ is cooled down to room temperature so that it solidifies. Then it is dried thoroughly, which may take from one to three days at room temperature and ordinary atmospheric conditions. After having been dried, the BaTiO₃ elements, throughout their bulk have macroscopic pores, interstices or crevices formed by air bubbles; these elements have a bulk density of the order of one-fourth of the theoretical density of barium titanate or the maximum density obtainable as a practical matter in fired barium titanate ceramic.

The paper is removed from the dried BaTiO₃ elements and these elements are then fired to maturity in substantially the standard manner of conventional dense BaTiO₃ elements, except that in the present process the firing is carried on at a temperature from about 50° C. to 80° C. higher than for firing the ordinary dense BaTiO₃ elements. Accordingly, therefore, in this firing step a temperature within the range from about 1380° C. to 1450° C. is maintained.

EXAMPLE II

In a manner very similar to that described in Example I, the method was applied to strontium-modified lead titanate zirconate having the formula $$Pb_{.94}Sr_{.06}(Ti_{0.53}Zr_{0.47})O_3$$

The composition of a suitable slip of lead zirconate titanate was as follows:

Pb(Zr,Ti)O₃ powder _____grams__ 9050
Marasperse _____do____ 140
NH₄OH (Conc. sol.) _____cc__ 40
Water _____cc__ 1600

To 3000 grams of the above slip is added:

P.V.A .71–30 (10% sol.) _____ grams 200
Congo red _____do____ 2
Igapal _____cc__ 5
Water _____cc__ 300

The mixture was treated in accordance with the method steps described in Example I. However, the firing temperature is adjusted to the material and for the lead zirconate titanate ceramic described was about 1250–1300° C.

Figure 1B:
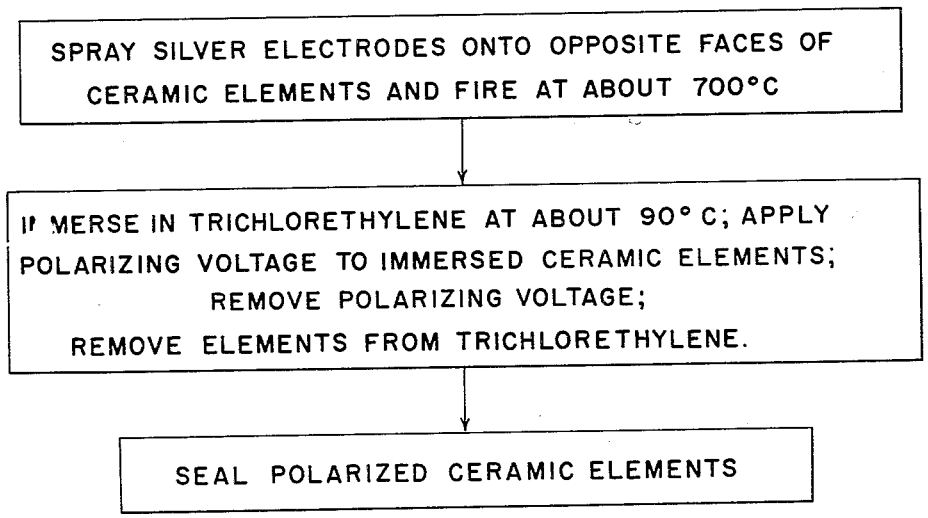

Referring now to FIGURE 1(b), after firing the ceramic elements to maturity, they are machined to size by sanding or sawing, and then are electroded by spraying silver paint onto the opposite major faces of the elements. Preferably the spray is directed at an acute angle to these faces so that the electrode material does not penetrate substantially into the interstices of the elements beyond the outer faces thereof. The electrode paint is then fired onto the elements at about 700° C. in the usual manner commonly practiced with dense ceramic elements.

Following the electroding operation, the elements are immersed in trichlorethylene at a temperature of about 90° to 100° C. and a relatively high D.C. polarizing voltage applied across electrodes, for example, 15 kv. per inch of thickness.

Finally, foil electrodes having lead-in conductors connected thereto are secured to the electroded faces of the ceramic element and the element is sealed against moisture by applying a thermosetting resin to its exposed edges, as well as to the foil electrodes, if desired.

The transducer element produced by the foregoing process is of cellular structure throughout containing separate macroscopic interstices or crevices filled with air (or other gaseous medium). Because of its cellulated, sponge-like construction the transducer element has a bulk density which is much lower than the density of barium titanate. Depending upon the amount of water added before stirring and the temperature during stirring, spongoid barium titanate may have a density within the range from about 0.5 to 3.0, with 1.4 being a typical value, as compared with a density of about 5.7 for solid barium titanate ceramic. Spongoid lead zirconate titanate material may have a bulk density within the range from about 1.0 to 4.5 with 2.5 being a typical value, as compared with a density of about 7.5 for solid lead titanate zirconate ceramic. Because of the lower density of spongoid ceramic materials, and because of the higher compliance of the elements due to their cellulated structure, the mechanical (acoustic) characteristic impedance of the spongoid ceramic elements is much lower than for dense ceramic elements, this mechanical impedance being equal to $\sqrt{density/compliance}$. As a result, the spongoid elements have a good impedance match with water, which makes them very good transducer elements for underwater operation.

The cellulated transducer elements have been found to operate effectively over a much wider frequency bandwidth around resonance than has been possible with transducers employing dense ceramic elements. Consequently, the transducer elements are capable of a rapid response to signals which start and end abruptly. Thus, transducers incorporating such elements are particularly well adapted for echo-ranging using pulse techniques, and other applications where a short time constant is vital.

In addition, the cellular ceramic material has been found to be considerably easier to form into transducer elements of the desired configuration, e.g., by sawing or sanding, than is the dense piezoelectric ceramic.

The following table represents a comparison of data on typical samples of dense, substantially pure, permanently polarized barium titanate and a modified form of lead zirconate titanate with representative samples of the same materials produced in accordance with the above-described process:

|  | BaTiO$_3$ | | Pb,Sr(Zr,Ti)O$_3$ [1] | |
| --- | --- | --- | --- | --- |
|  | Porous | Dense | Porous | Dense |
| K | 300 | 1,700 | 200 | 1,100 |
| Y$^E$ (× 10$^9$) | 8 | 110 | 5.0 | 63 |
| $d_{33}$ (× 10$^{-12}$) | 185 | 190 | 230 | 235 |
| $g_{33}$ | 50–70 | 12.6 | 130 | 24 |
| $d_{31}$ | 20 | 75 | 26 | 97 |
| Density (gms./cc.) | 1.3 | 5.7 | 2.5 | 7.5 |
| $k_{33}$ | .33 | .46 | .37 | .63 |
| Frequency Constant (parallel mode) | 1,150 | 2,600 | 745 | 1,970 |

[1] Pb$_{0.94}$Sr$_{0.06}$(Zr$_{0.53}$Ti$_{0.47}$)O$_3$

In the foregoing table: K is the relative dielectric constant or permittivity with respect to the absolute dielectric constant of free space; Y$^E$ is the short-circuited Young's modulus in the parallel direction, a ratio of stress to strain, expressed in newtons per square meter; $d_{33}$ is the piezoelectric coefficient relating the parallel strain to the applied electric field, expressed in meters per volt; $d_{31}$ is the corresponding piezoelectric coefficient in the lateral mode; $g_{33}$ is the piezoelectric coefficient, expressed in volt millimeters per newton, which indicates the open circuit electric field strength of the ceramic element for a given mechanical stress in the parallel mode; $k_{33}$ is the coefficient of electromechanical coupling in the parallel mode, which is defined as the ratio of the square root of the mechanical output to the square root of the electrical input; and the frequency constant, expressed in kilocycle millimeters, indicates the resonant frequency in kilocycles for a ceramic element 1 mm. thick, this resonant frequency varying inversely with the thickness of the element. The parallel, or 33, mode refers to mechanical strain in the same direction as the electric field applied to the ceramic element; in the case of an electroacoustic transducer element of the expander type, it relates to the acoustic radiation from either electroded face of the element. The lateral, or 31, mode refers to mechanical strain perpendicular to the applied electric field; in an electroacoustic transducer element of the expander type, it relates to acoustic radiation from any of the non-electroded faces of a rectangular element.

It will be apparent to those skilled in the art to which this invention pertains that the present transducer element has a reduced elastic cross coupling, as a consequence of its cellular structure.

From a comparison of the $d_{31}$ coefficients for the respective ceramics in the above table it will be apparent that there is comparatively little direct piezoelectric excitation of lateral mode in the cellular sponge-like ceramic of the present invention. For this reason, when the porous ceramic is operated in the 33 (parallel) mode, radiating acoustic energy from only one electroded face, there is relatively little energy radiated from the element transverse to this direction. Accordingly, the radiated acoustic energy is highly directive and by proper design a substantially single lobe pattern may be obtained, which is particularly desirable in certain underwater applications. In the past, because of the relatively high elastic cross coupling in dense ceramic elements, it was not possible to operate such elements in the 33 mode where directivity was an important consideration, except by providing a number of elements of that type each elongated in the parallel mode direction and each having a relatively small radiating face area and arranged in mosaic arrays which were difficult and expensive to construct for operation in the desired manner. With the cellular ceramic element of the present invention, by proper design good directivity may be obtained with an electroacoustic transducer employing a single ceramic element having a relatively large radiating face area which radiates energy in the 33, or parallel mode. A further important consideration worth noting is that any ceramic element used for electromechanical transducer purposes has optimum efficiency when operated in its 33 mode; that is, for a given electrical energy input maximum mechanical output is obtained by operating in this mode. Thus, in the present invention, a ceramic transducer element of simple and inexpensive configuration may be operated in its most efficient mode (the 33 mode), without resulting in lack of directivity or substantial interference between the parallel and lateral modes.

Figure 2:
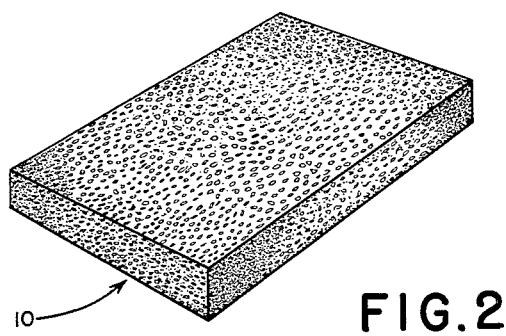
FIGURE 2 is a perspective view of a cellular ceramic element produced in accordance with the steps in FIG. 1(a)

FIGURE 2 illustrates an unelectroded, cellular ceramic element 10 produced by the first five steps of the process of the present invention described in detail above and outlined in FIG. 1. This element is here shown as rectangular in configuration and in a typical instance may be about 4 inches long, by 2 inches wide by about ½ inch thick. As indicated in the drawing, the element is of cellular construction, having separated macroscopic air holes or interstices throughout.

Figure 3:
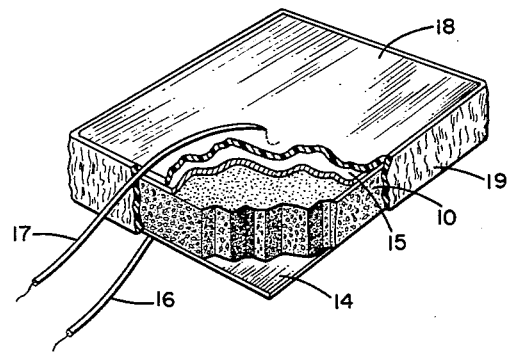
FIGURE 3 is a perspective view of a finished cellular ceramic element produced in accordance with the process diagrammed in FIGS. 1(a) and 1(b)

FIGURE 3 illustrates this cellular ceramic element after it has been electroded and sealed in accordance with the concluding steps in the present process. The interstices throughout the porous ceramic body are filled with air. The opposite major faces of the element are coated with sprayed-on silver paint against which are secured the foil electrodes 14 and 15, which may be of brass, or gold-coated silver, or other suitable material. The lead-in conductors 16 and 17 have intimate contact with the respective foil electrodes. It is intended to radiate acoustic energy from the major face on the body contacted by electrode 14, but not from the other major face at which electrode 15 is located. A coating 18 of suitable plastic is applied to the outer face of foil electrode 15. Actually there is a thin layer of air between this electrode 15 and the plastic coating and the net effect of this arrangement is to decouple this foil electrode 15 from the surrounding medium, so that no acoustic energy is radiated from this major face of the ceramic element. This, of course, does not interfere with the acoustic radiation from the face on the ceramic element contacted by electrode 14. The moisture-proofing of the ceramic trandsucer element is completed by sealing its edges with a thermosetting resin 19.

Figure 4:
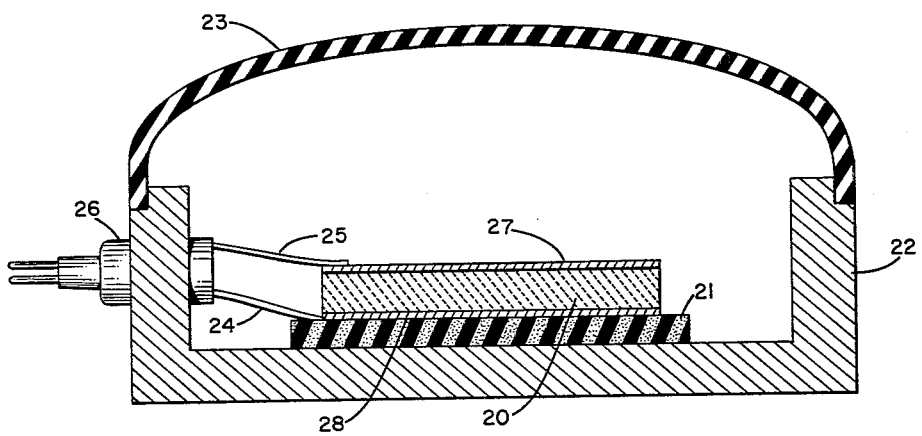
FIGURE 4 is a longitudinal section through an electro-acoustic transducer for underwater operation which incorporates a ceramic piezoelectric element according to the present invention.

In FIGURE 4, there is shown an underwater transducer employing a transducer element generally similar to that shown in FIG. 3. The ceramic element 20 is identical in all respects to that of FIG. 3, except that the plastic coating on the one electroded face is omitted. Instead, this face, which is contacted by a foil electrode 28, is mounted on a sponge rubber pad 21, which is full of air holes which act effectively to decouple this face of the ceramic element. The other major face on the ceramic body 20 is contacted by a foil electrode 27, and it is intended to radiate acoustic energy from this face. The mounting pad 21 is mounted on an open-ended housing base 22 across whose open end there extends a rubber cap 23. The interior of the housing is filled with oil. The lead-in conductors 24, 25 for the electrodes on the opposite faces of the ceramic element extend into the housing through a fluid-tight seal 26.

In the operation of the transducer for transmitting acoustic energy, a voltage of a predetermined frequency is applied across the electrodes 27, 28 on the ceramic element 20, causing acoustic energy to be radiated from the electroded face at 27 of the ceramic element. This acoustic energy is transmitted through the oil and the rubber cap 23 into the water with very little energy loss therein since both the oil and rubber have a very good impedance match with water.

Conversely, if the transducer is operated as a receiver, then acoustic energy transmitted through the water passes through the rubber cap 23 and the oil in the housing and impinges upon the electroded face at 27 on the ceramic element 20, causing the latter to produce a voltage across the electrodes 27, 28 which is representative of the acoustic signal received.

In the foregoing description, the material of which the transducer element is composed has been specified as being substantially pure polycrystalline barium titanate or lead zirconate titanate. However, it is to be understood that within the purview of the present invention, the method may be employed with any electromechanically responsive ceramic materials. As an example of other suitable ceramic material, the ceramic may consist of a mixture of barium titanate and a small percentage (such as 2% to 3½%) of zirconia ($ZrO_2$), or barium titanate and a small percentage of barium zirconate ($BaZrO_3$) as disclosed and claimed in U.S. Patent No. 2,708,243 to E. J. Brajer. Alternatively, other mixtures of barium titanate, or piezoelectric ceramic materials other than barium titanate, may be used. Additional examples of suitable materials are given in U.S. Letters Patent No. 2,906,710 issued on application Serial No. 527,720 filed August 11, 1955, and U.S. Letters Patent No. 2,911,370 issued on a continuation-in-part of applications, Serial Nos. 550,868 and 550,869 filed December 5, 1955, and now abandoned.

While there has been disclosed in the foregoing description a specific presently preferred manner of practicing the process of the present invention, it is to be understood that various modifications, omissions and refinements which depart from the disclosed embodiments of the process of the present invention may be adopted without departing from the spirit and scope of this invention.

This application is a division of Serial No. 674,205 (matured to Patent No. 2,892,107) which in turn was a continuation of Serial No. 399,282 filed December 21, 1953, and now abandoned.

We claim:

1. A method of producing an electromechanical transducer element of polycrystalline ceramic material capable of a substantial mechanical distortion when electrical energy is applied thereto, comprising the steps of; providing an aqueous slip containing the ceramic material; adding to the slip a vehicle, a wetting agent, and a gelling agent; thereafter heating and vigorously agitating the mixture to aerate it; cooling and drying the aerated mixture to produce an aerated cellular element of low bulk density; firing the dried element to maturity; and operatively associating with said element electrical conductor means for supplying electrical energy thereto.

2. A method according to claim 1 wherein said ceramic material is primarily lead zirconate titanate.

3. A method according to claim 1 wherein said ceramic material is primarily barium titanate.

4. A method according to claim 1 wherein said ceramic material is a polycrystalline ferromagnetic material having a substantial magnetostrictive response.

5. A method of producing an electromechanical transducer element consisting primarily of a polycrystalline ferromagnetic ceramic material, comprising the steps of: providing an aqueous slip of said material; adding water, a wetting agent, and a water-soluble gelling agent to said slip; agitating the mixture vigorously to aerate it while at the same time maintaining the mixture heated; cooling and drying the aerated mixture to produce a low density aerated sponge-like element; firing the element to maturity; and operatively associating with said element electrical conductor means for supplying electromagnetic energy thereto.

6. A method of producing an electromechanical transducer element consisting primarily of a polarizable ferroelectric ceramic material, comprising the steps of: providing an aqueous slip of said material; adding to said slip water, a wetting agent and a water-soluble gelling agent; heating the mixture and simultaneously agitating vigorously to aerate it; drying the aerated mixture into an aerated rigid element of cellular construction; firing the dried element; applying to the element a polarizing voltage and at the same time immersing the aerated element in liquid which has a high dielectric constant and which fills the interstices in the cellular element; and thereafter removing said liquid from the polarized aerated rigid element.

7. A method of producing an electromechanical transducer element consisting primarily of a polarizable ferroelectric material which comprises the steps of: providing a slip of said material containing water, a binder, and a dispersing agent; adding to said slip water, a water-soluble gelling agent, and a wetting agent; heating the mixture to about 50° C., and simultaneously stirring it vigorously to aerate it; drying the aerated mixture into an aerated element of cellular structure; firing the dried element to ceramic maturity; thereafter spraying silver paint at an acute angle onto opposite faces of the element; firing the electroded element at about 700° C.; immersing said element in trichlorethylene heated to about 90° to 100° C. and applying to the electrodes on the element a polarizing voltage; removing the polarized element from the trichlorethylene; and sealing said element thereafter to render it substantially moisture proof.

8. A method of producing an electromechanical transducer element of polycrystalline ceramic material capable of a substantial mechanical response when electrical energy is applied thereto, comprising the steps of: providing an aqueous slip containing the ceramic material; adding to the slip a vehicle, a wetting agent, and a gelling agent; thereafter heating and vigorously agitating the mixture to aerate it; cooling and drying the aerated mixture to produce an aerated cellular element of low bulk density; firing the dry element to maturity; and polarizing the mature element.

References Cited in the file of this patent

UNITED STATES PATENTS

| | | |
|---|---|---|
| 2,151,932 | Nielson | Mar. 28, 1939 |
| 2,235,881 | France | Mar. 25, 1941 |
| 2,486,560 | Gray | Nov. 1, 1949 |
| 2,543,987 | Ramsay | Mar. 6, 1951 |